United States Patent
Kim et al.

(10) Patent No.: US 9,910,288 B2
(45) Date of Patent: Mar. 6, 2018

(54) CAMERA LENS MODULE

(71) Applicant: Samsung Electronics Co., Ltd, Gyeonggi-do (KR)

(72) Inventors: Jung-Soo Kim, Gyeongg-do (KR); Kwang-Seok Byon, Gyeonggi-do (KR); Chi-Young Park, Gyeonggi-do (KR); Young-Jae Hwang, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/331,805

(22) Filed: Oct. 21, 2016

(65) Prior Publication Data

US 2017/0115501 A1    Apr. 27, 2017

(30) Foreign Application Priority Data

Oct. 23, 2015    (KR) .................. 10-2015-0148367

(51) Int. Cl.
*G02B 7/02*     (2006.01)
*G02B 27/64*    (2006.01)
(Continued)

(52) U.S. Cl.
CPC .............. *G02B 27/64* (2013.01); *G02B 7/02* (2013.01); *G02B 27/646* (2013.01); *G03B 3/10* (2013.01); *G03B 13/36* (2013.01); *G03B 17/00* (2013.01); *G02B 7/04* (2013.01); *G02B 7/09* (2013.01); *G02B 7/102* (2013.01); *G02B 7/28* (2013.01); *G03B 2205/0046* (2013.01); *G03B 2205/0069* (2013.01)

(58) Field of Classification Search
CPC .... G02B 27/0018; G02B 27/08; G02B 27/64; G02B 27/646; G02B 7/02; G02B 7/023; G02B 7/025; G02B 7/026; G02B 7/04; G02B 7/08; G02B 7/09; G02B 7/102; G02B 7/28; G03B 3/10; G03B 5/02; G03B 13/16; G03B 17/00; G03B 17/04; G03B 2205/0046; G03B 2205/0069; H04N 5/225; H04N 5/2254; H04N 5/228
USPC ........ 359/811, 813, 819, 822–825, 601, 554, 359/557; 396/52, 55; 348/208.2–208.4, 348/208.99
See application file for complete search history.

(56) References Cited

U.S. PATENT DOCUMENTS 5,160,877 A *  11/1992  Fujiwara ............... B25J 9/1015
                                                    310/90.5
7,154,682 B2 * 12/2006  Umezu .................. G02B 15/00
                                                    348/208.99

(Continued)

*Primary Examiner* — Loha Ben (57) ABSTRACT

According to an embodiment, an electronic device including a camera lens module having a miniaturization and a lightening function, as well as a hand-trembling correction function mounted thereon, is described. The camera lens module may include a base, a first moving part containing a lens assembly and coupled to the base, and a second moving part. The first moving part may be configured to move on a plane perpendicular to the optical axis of the lens assembly. The second moving part may be disposed under the base and configured to move in the optical axis direction of the lens assembly. A variable gap between the first moving part and the second moving part may have a distance that varies based on a movement of the second moving part forward or backward in the optical axis direction.

19 Claims, 8 Drawing Sheets

(51) Int. Cl.
  *G03B 17/00*   (2006.01)
  *G03B 13/36*   (2006.01)
  *G03B 3/10*    (2006.01)
  *G02B 7/04*        (2006.01)
  *G02B 7/09*        (2006.01)
  *G02B 7/10*        (2006.01)
  *G02B 7/28*        (2006.01)

(56) References Cited

U.S. PATENT DOCUMENTS

| | | | |
|---|---|---|---|
| 8,059,950 B2 * | 11/2011 | Nishimura | G03B 17/00 359/557 |
| 8,913,139 B2 | 12/2014 | Park et al. | |
| 8,964,316 B2 * | 2/2015 | Ohno | G02B 7/09 359/823 |
| 9,277,325 B2 * | 3/2016 | Zhang | H04R 9/025 |
| 9,405,088 B2 * | 8/2016 | Hayashi | G02B 7/08 |
| 9,513,455 B2 * | 12/2016 | Kokichi | G02B 7/023 |
| 9,766,426 B2 * | 9/2017 | Lam | G02B 7/09 |
| 9,791,661 B2 * | 10/2017 | Hayashi | G02B 7/09 |

\* cited by examiner

CAMERA LENS MODULE

CROSS-REFERENCE TO RELATED APPLICATION(S) AND CLAIM OF PRIORITY

The present application is related to claims the priority under 35 U.S.C. § 119(a) to Korean Application Serial No. 10-2015-0148367, which was filed in the Korean Intellectual Property Office on Oct. 23, 2015, the entire content of which is hereby incorporated by reference.

TECHNICAL FIELD

Various embodiments of the present disclosure relate to a hand-trembling correction device of a camera lens module mounted on an electronic device.

BACKGROUND

A typical camera captures an image of a subject, forms the captured image as image data, and records the image data in a proper file form. Therefore, when a hand-trembling of a photographer or wobble caused by surrounding vibrations is directly reflected in the photographed image, a degradation of the image quality, such as image spreading or blurring, occurs.

A technique for improving the performance of the camera lens module includes a hand-trembling correction technology. The hand-trembling correction technology compensates for the wobble of a subject's phase according to the vibration of a body, such as a hand-trembling of a user, during photographing. The hand-trembling correction, for example, is possible by detecting a vibration applied to a device through a plurality of angular speed sensors mounted on an electronic device, such as a camera, and moving a lens or an image sensor according to an angular speed and a direction of a detected vibration.

Recently, various image stabilization technologies that automatically correct camera shake have been developed. For example, a scheme which fixes an image formation position on an image sensor may be considered by drive-controlling an optical lens as much as the appropriate amount of movement corresponding to the shaking of a camera. At this time, in order to drive the optical lens, a voice coil motor (VCM) actuator using electromagnetic interaction between a magnet and a driving coil may be applied.

SUMMARY

The expansion of a hand-trembling correction angle is required in order to implement a hand-trembling correction function having an improved performance on a camera lens module. For the expansion of the correction angle, DC sensitivity should be improved by making the size of the driving source larger or making a resonant frequency lower.

However, an increase in the size of the driving source is not suitable for a camera lens module in a miniaturization and lightening trend. The problem of designing a fixed module by designing a low resonant frequency is that the designed module is very vulnerable to external shocks due to a low restitution force and adsorption force.

To address the above-discussed deficiencies, it is a primary object to provide a camera lens module having a miniaturization and lightening function, as well as a hand-trembling correction function mounted thereon and capable of varying a resonant frequency.

According to various embodiments of the present disclosure, a camera lens module includes: a base; a first moving part configured to contain a lens assembly, be coupled to the base, and move on a plane perpendicular to an optical axis of the lens assembly; and a second moving part arranged under the base and configured to move in the optical axis of the lens assembly. The camera lens module may be configured to form a variable gap between the first moving part and the second moving part through the movement of the second moving part.

In some embodiments of this disclosure, the camera lens module may further include: at least one magnet mounted on one between the base and the first moving part; and at least one yoke arranged to correspond to the magnet and mounted on the second moving part, wherein the magnet and yoke may generate a magnetic force in the optical axis direction, through the movement of the second moving part.

In various embodiments of the disclosure, the camera lens module may further include a driving part disposed on one side of the base or the second moving part and configured to allow the second moving part to move forward and backward in the optical axis direction.

Various embodiments of the disclosure further include, according to the driving of the driving part, the forward and backward movement of the second moving part in the optical axis direction may change the gap between the first moving part and the second moving part. As a result, a resonant frequency between the first moving part and the second moving part may be changed.

In various embodiments of the disclosure, the camera lens module may include a cover part arranged above the first moving part to cover the upper side of the first moving part, wherein the cover part may include at least one driving coil arranged to face the magnet.

In various embodiments of the disclosure, at least two pairs of the magnets may be symmetrically arranged with respect to the optical axis.

In various embodiments of the disclosure, the at least one coil and the at least one magnet may be arranged to face each other, and the first moving part may generate a movable driving force, by interaction between the driving coil and the magnet.

In an embodiment, a gap between the magnet the yoke is varied, the adsorption force of the magnet and the yoke, DC sensitivity and the amount of deflection of the camera lens module caused by gravity may be varied.

In an embodiment, the second moving part may include at least one yoke groove for installation of at least one yoke, and centers of the yoke, the magnet, and the coil may be arranged on the same line.

In accordance with an embodiment of the disclosure, when the yoke is stably disposed, the yoke groove may include a yoke hole in the center of the yoke groove, in order to generate an interaction between the yoke and the magnet.

In some embodiments of the disclosure, the base may include a guide hole configured to guide the yoke stably placed in the yoke groove of the second moving part to move in the optical axis direction, wherein the guide hole may be formed larger than the yoke groove to secure a space where the yoke groove can move from side to side.

In various embodiments of the disclosure, the camera lens module may include at least one rod arranged to penetrate through the base, wherein the at least one rod may guide the second moving part which moves in the optical axis direction. The camera lens module may include an elastic member arranged on an external surface of the rod and configured to set a range of a variable gap between the magnet and the yoke according to movement of the second moving part.

In various embodiments, the camera lens module may further include a flexible printed circuit board arranged on the cover part and electrically connected to the driving part to supply power.

In various embodiments of the disclosure, the base, the first moving part, and the second moving part may be arranged in a row along the side of the lens assembly.

A camera lens module according to an embodiment of the present disclosure implements to enable a gap between a magnet and a yoke within the module to be variable, thereby improving a hand-trembling correction performance through a control of a hand-trembling correction angle according to varying a resonant frequency.

In addition, a camera lens module according to an embodiment of the present disclosure designs a resonant frequency in a variable type, according to a photographing situation, thereby coping with a hand-trembling changed according to, for example, each photographing mode and static image/video, in real time.

In addition, a camera lens module according to an embodiment of the present disclosure may be configured to increase a variable resonant frequency above a certain level, thereby implementing a hand-trembling locking function.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document and those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Furthermore, a camera lens module applied to the electronic device is a removable interchangeable lens to a camera, and may include an auto focusing function which can obtain a clear image on an image forming plane of an image sensor by moving the image sensor or a lens disposed at the front of the image sensor according to a distance with a subject along the optical axis direction. In addition, the camera lens module may have a hand-trembling correction function for compensating for the wobble of a phase of a subject according to a vibration of a body, such as a user's hand-trembling.

In the present embodiment, a hand-trembling correction technology (Optical Image Stabilizer; OIS) used in an interchangeable lens is described as an example relating to the camera lens module. However, the camera lens module is not limited thereto and may have various modifications as long as the module is a camera lens module 10 used for a portable electronic device such a camera applied to a smart phone. The present embodiment will describe a camera lens module which can change a resonant frequency by varying a gap between a magnet and a york.

In the present specification, the term "a user" may refer to a person who uses an electronic device such as a camera lens module or a device which uses an electronic device (for example, an artificial intelligence electronic device).

Figure 1:
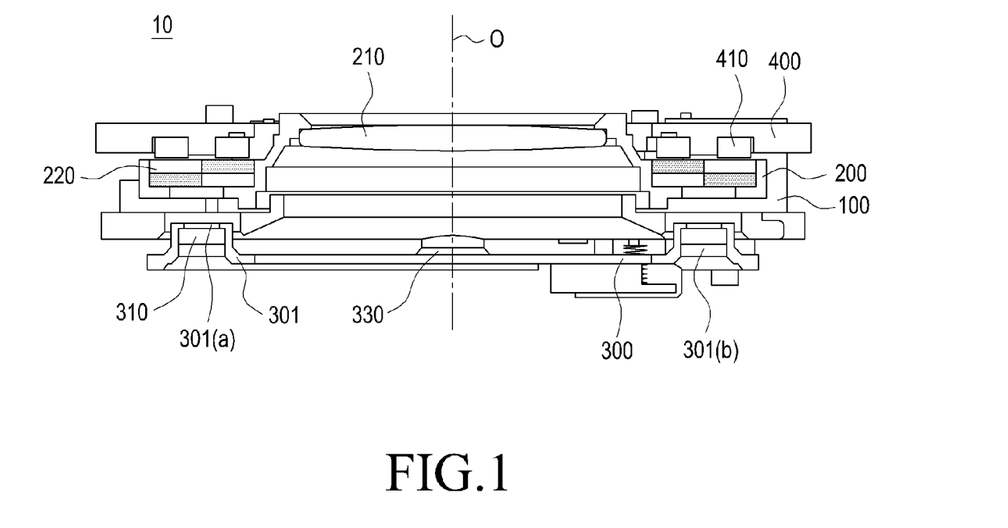
FIG. 1 is a cross-sectional view which illustrates main parts of a camera lens module according to an embodiment of the present disclosure.
Figure 2:
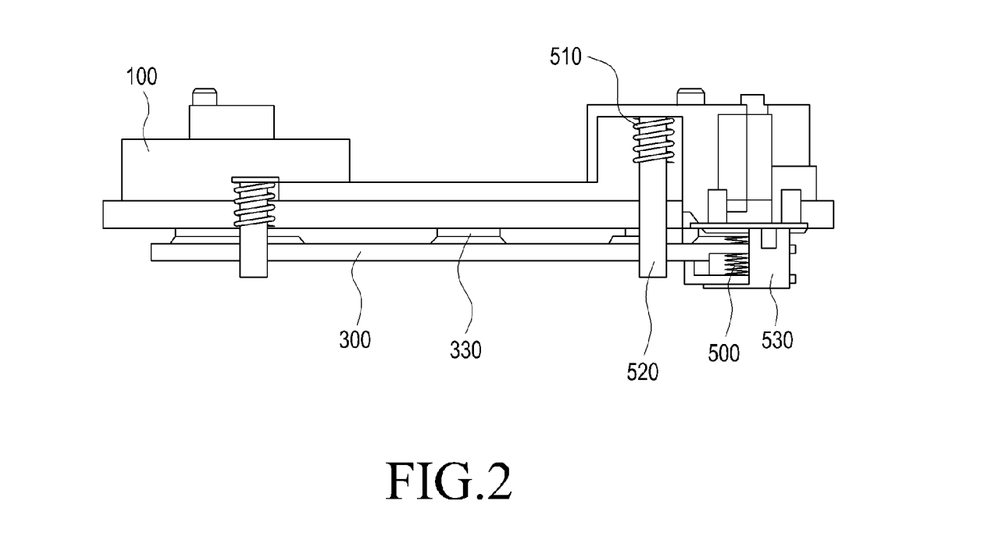
FIG. 2 is a cross-sectional view which illustrates configurations of a base and a second moving part of a camera lens module according to an embodiment of the present disclosure.
Figure 3:
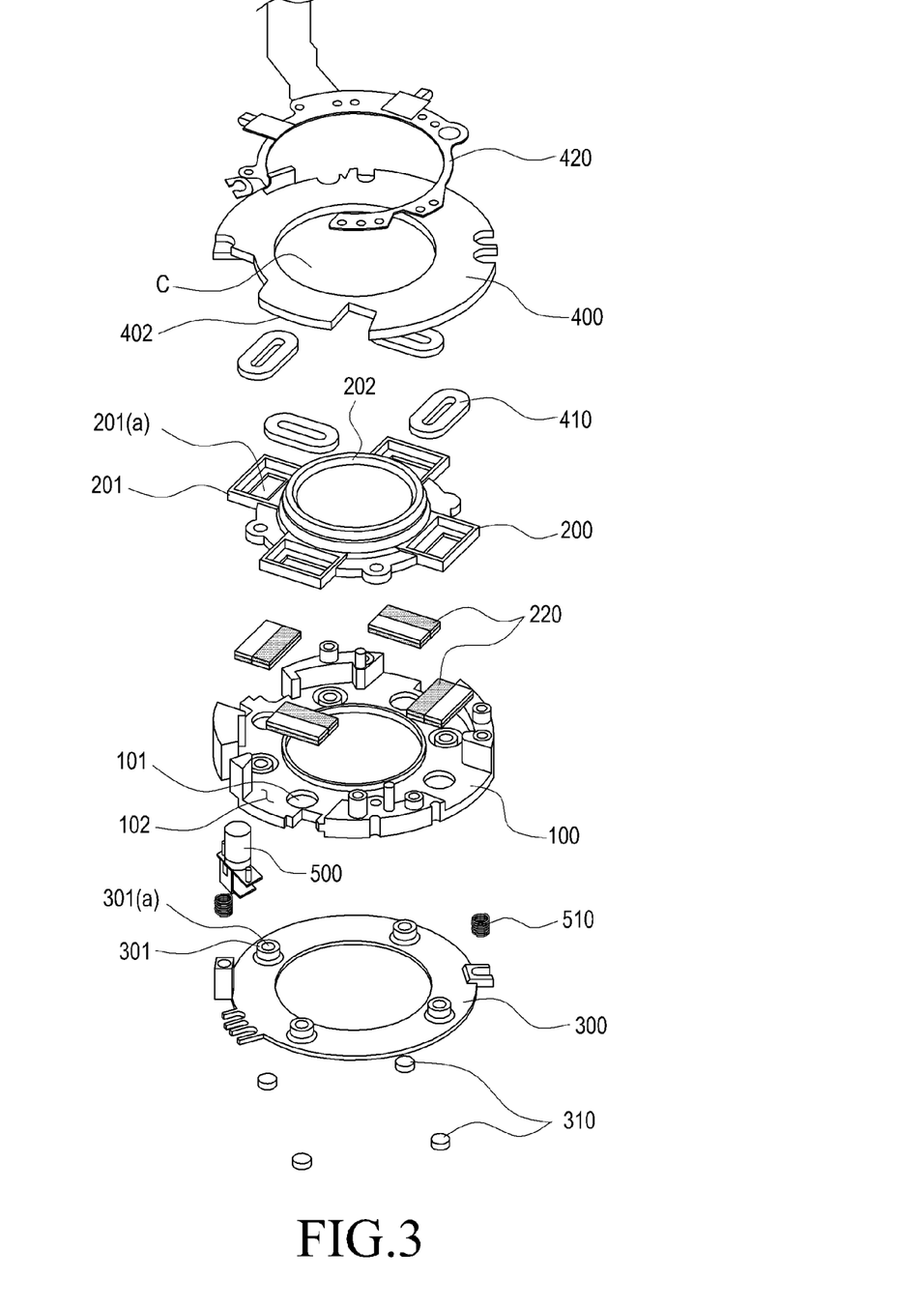
FIG. 3 is an exploded perspective view which illustrates main parts of a camera lens module, according to an embodiment of the present disclosure.
Figure 4:
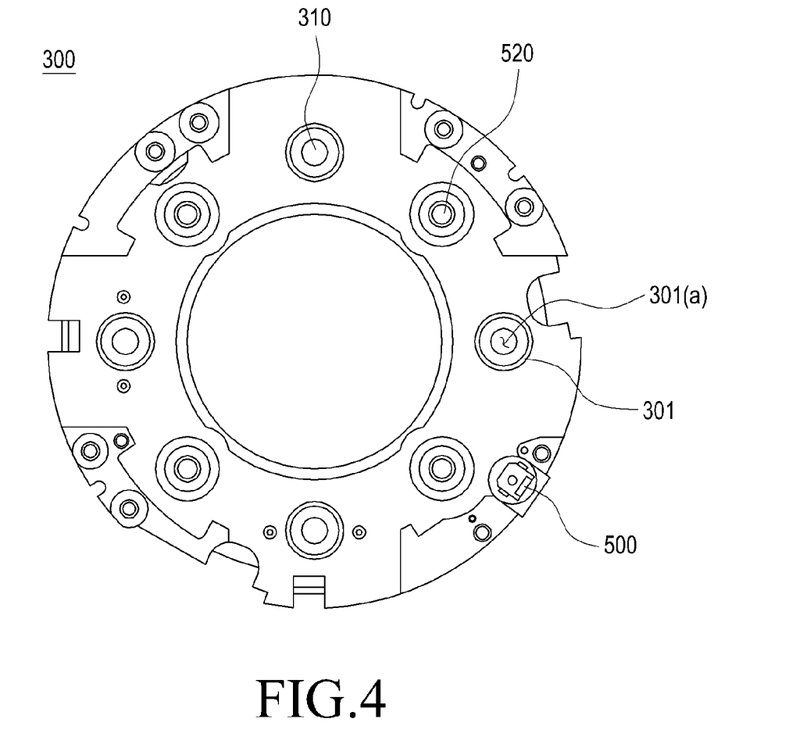
FIG. 4 is a top view of a second moving part of a camera lens module, in a view from the above, according to an embodiment of the present disclosure.

FIG. 1 is a cross-sectional view which illustrates main parts of a camera lens module according to an embodiment of the present disclosure. FIG. 2 is a cross-sectional view which illustrates configurations of a base and a second moving part of a camera lens module according to an embodiment of the present disclosure. FIG. 3 is an exploded perspective view which illustrates main parts of a camera lens module according to an embodiment of the present disclosure. FIG. 4 is a top view of a second moving part of a camera lens module, in a view from the above, according to an embodiment of the present disclosure.

Hereinafter, components of an electronic device including a camera lens module 10 will be described with reference to FIGS. 1 to 4.

Referring to FIGS. 1 to 4, a camera lens module 10 according to an embodiment of the present disclosure may include a base 100, a first moving part 200, a second moving part 300, and a cover part 400.

The camera lens module 10 may be implemented on an interchangeable lens, may stably capture an image of a subject desired by a user without wobble caused by surrounding vibration or a hand-trembling of a photographer, and may transfer the captured image into a camera.

A base 100 is disposed between a first moving part 200 and a second moving part 300, provides a reference point when the first moving part 200 and the second moving part 300 move, and supports components arranged on camera lens module 10.

The base 100 has a central hole C including an optical axis O and may include at least one guide hole 101 around the central hole C. In addition, the base 100 may include a driving part seating space 102 in which a driving part 500 configured to transfer power to the second moving part 300 can be mounted.

The central hole C of the base 100 may be arranged in the form of a circle around the central axis of the base 100 and may function as a path for a light provided to a lens assembly 210.

The guide hole 101 may provide a space through which a yoke 310 can move in the direction of the optical axis O of the lens assembly 210, and may be designed to have a shape and structure for guiding the yoke 310 to correspond to the space in which the yoke 310 is mounted. For example, in an embodiment of the present disclosure, four guide holes 101 may be configured and arranged at the same interval and at corresponding positions around the central hole C. However, the present disclosure is not limited to the number and arrangement of guide holes 101, which are presented herein, and may include various numbers of guide holes 101 or have various positions for the guide holes 101, required in order to prevent a hand-trembling, as is to be achieved by the present disclosure.

The driving part seating space 102 may be arranged outside the base 100 and provide a space where the driving part 500 can be installed. The driving part 500 may be arranged over the base 100 and the second moving part 300, and the driving part seating space 102 may include a space of the second moving part 300.

Besides, the base 100 may be formed to have various structures including shapes such as a groove and a hole, which can be coupled to the first moving part 200 and the second moving part 300.

The first moving part 200 may be configured to receive the lens assembly 210, to be coupled to an upper portion of the base 100, and to be movable. For example, the first moving part 200 may move on a plane (e.g. an X-Y plane) perpendicular to the optical axis O of the lens assembly 210 according to a user's hand-trembling to perform a hand-trembling correction operation.

The lens assembly 210 may include at least one lens and may be received in the second moving part 300. As the second moving part 300 moves on the plane (e.g. an X-Y plane) perpendicular to the optical axis O direction, the lens assembly 210 also moves on the plane perpendicular to the optical axis O to perform a hand-trembling correction operation.

The first moving part 200 may have at least one magnet 220 mounted around the lens assembly 210.

The magnet 220 is assembled at a position facing a driving coil 410 disposed above the magnet and performs electromagnetic interaction so as to configure, for example, a voice coil motor (VCM) actuator. Both ends of the driving coil 410 may be connected to a circuit board 420 which applies controlled actuating power. The first moving part 200 may be driven on the plane (e.g. an X-Y plane) perpendicular to the optical axis O according to the electromagnetic interaction between the magnet 220 and the driving coil 410, and may perform a correction operation.

Accordingly, the first moving part 200 may include a lens seating part 202 for receiving the lens assembly 210 and magnet seating parts 201 for mounting at least one magnet 220.

The lens seating part 202 may include a structure, such as a step, around the central hole C so that the lens assembly 210 can be safely coupled or supported thereon.

The magnet seating part 201 may be arranged around the lens seating part 202 and may be configured to cover an edge of the magnet 220 to safely support the magnet when the magnet 220 is stably disposed. In addition, when the magnet 220 is stably placed on the magnet seating part 201, the magnet seating part 201 is configured to have an open upper side to allow the magnet to interact with the driving coil 410 arranged above the magnet, and may have a magnet seating hole 201a formed at a central portion of the bottom of the magnet seating part to allow the magnet to interact with the yoke 310 arranged under the magnet.

For example, in an embodiment of the present disclosure, the lens seating part 202 may be arranged on an edge portion of the central hole C including the optical axis O, and four magnet seating parts 201 may be configured to install four magnets 220 and may be arranged at the same interval and at corresponding positions around the central hole C. In this case, the centers of the driving coil 410 and the magnet 220 are arranged on the same line so that the driving coil 410 and the magnet 220 may interact with each other.

In addition, the magnet seating part 201 may be configured such that the upper surface thereof is opened and at least some of the lower surface thereof is closed, to allow the magnet 220 to be stably placed in a direction from the upper side to the lower side. In addition, a part of the lower surface may include a hole (for example, seating hole 201a) to allow the magnet 220 stably placed on the magnet seating part 201 to interact with the driving coil 410 or the yoke 310 on the upper or lower surface. Meanwhile, the present disclosure is not limited to the number and arrangement of magnet seating parts 201, which are presented herein according to an embodiment, and may include various numbers of magnet seating parts 201 or have various positions for the magnet seating parts 201, required in order to prevent a hand-trembling, as is to be achieved by the present disclosure. It is natural that, in the case of a structure in which the magnet 220 can be stably placed in a direction from the lower side to the upper side, the lower surface of the magnet seating part may be opened and the seating hole 201a may be configured on the upper surface of the magnet seating part, further, according to design changes, various numbers of seating holes 201a may be arranged on various positions.

The second moving part 300 is configured to be able to move and be coupled to the lower portion of the base 100. For example, the second moving part 300 may move in the optical axis O direction of the lens assembly 210 according to a hand-trembling of a user to perform a hand-trembling correction operation.

The second moving part 300 may have at least one yoke mounted around the central hole C including the optical axis O.

The yoke 310 may be assembled at a position facing the magnet 220 of the first moving part 200 arranged above the yoke, according to varying of a gap (g) between the yoke and the magnet 220, the magnetic force in the optical axis direction may be generated and the resonant frequency (f) may be adjusted. A hand-trembling correction process performed according to the varying of the resonant frequency (f) will be described later.

The second moving part 300 may include yoke grooves 301 for mounting the at least one yoke 310.

The yoke groove 301 may be arranged around the central hole C and may be configured to cover an edge of the yoke 310 to safely support the yoke when the yoke 310 is safely disposed. In addition, the second moving part may include at least one yoke hole 301a, which is arranged on the upper side of the yoke groove 301 and has an open upper side, to allow the yoke to interact with the magnet 220 disposed above the yoke when the yoke 310 has been stably placed in the yoke groove 301. The yoke is stably placed in a direction from the lower side to the upper side and a yoke stopper 301b may be disposed at the bottom of the yoke groove 301 to prevent the yoke 310 from leaving for the lower side.

For example, in an embodiment of the present disclosure, four yoke grooves 301 may be configured to receive four yokes 310 and arranged at the same interval and at corresponding positions around the central hole C. In this case, the centers of the driving coil 410 and the magnet 220, the yoke 310 are arranged on the same line so that the driving coil 410, the magnet 220, and the yoke 310 may interact with each other.

Further, the yokes 310 are arranged in the yoke grooves 301 in a direction from the lower side to the upper side, and the yoke hole 301a may be configured to be smaller than the yoke 310 to prevent the position of the yoke 310 from changing by the interaction with the magnet 220. Also, the edge of the yoke 310 may be guided to limit the up-down or left-right movement of the yoke 310. Meanwhile, the present disclosure is not limited to the number and arrangement of yoke grooves 301, which are presented herein according to an embodiment, and may include various numbers of yoke grooves 301 or have various positions for the yoke grooves 301, required in order to prevent a hand-trembling, as is to be achieved by the present disclosure.

A yoke central axis 330 may be disposed at the center of the second moving part 300 to guide the second moving part 300 which moves in the optical axis O. At the centers of a plurality of the yoke grooves 301, the yoke central axes 330 may help the second moving part 300 safely operate.

A cover part 400 is arranged above the first moving part 200 and configured to cover the upper side of the camera lens module 10. For example, the cover part 400 can protect components by completely closing the part opened in the upper portion, except for an opening port for photographing (for example, a central hole) for the lens assembly 210, while components such as the lens assembly 210, the base 100, the first moving part 200, and the second moving part 300 are coupled.

At least one driving coil 410 may be arranged on the lower side surface of the cover part 400 and mounted around the central hole C including the optical axis O.

The driving coil 410 is assembled at a position facing the magnet 220 of the first moving part 200 arranged under the driving coil and performs electromagnetic interaction with the magnet to configure a voice coil motor (VCM) actuator. Both ends of the driving coil 410 may be connected to the circuit board 420 which applies controlled actuating power. The driving coil 410 is fixedly arranged on the bottom of the cover part 400. The first moving part 200 on which the magnet 220 is mounted may be driven on the plane (e.g. an X-Y plane) perpendicular to the optical axis O according to the electromagnetic interaction between the magnet 220 and the driving coil 410 and may perform a correction operation. Meanwhile, the driving coil 410 is not limited thereto, and the driving coil 410 may be driven on the plane (e.g. an X-Y plane) perpendicular to an optical axis O, on which the magnet 220 is fixed, and may perform a correction operation.

The cover part may include at least one driving coil 410, and the driving coils 410 may be arranged to face the magnets 220 mounted on the first moving part, respectively. A flexible printed circuit board 420 may be arranged around the cover part in order to apply electronic signals to the driving coils 410, respectively. The driving coils 410 may be connected to the flexible printed circuit board 420. For example, a hole sensor (not shown) for sensing a position may be mounted on the flexible printed circuit board 420 to detect a position of the first moving part 200 or the lens assembly 210 received in the first moving part 200. When an electronic signal is applied to the driving coil 410 arranged to form a major axis in a first direction X, the first moving part 200 and the lens assembly 210 may move in the first direction X on the plane perpendicular to the optical axis O. When an electronic signal is applied to the driving coil 410 arranged to form a major axis in a second direction Y, the first moving part 200 and the lens assembly 210 may move in the second direction Y on the plane perpendicular to the optical axis O. Therefore, according to vibration caused by an external force such as a hand-trembling of a user, an electronic signal is applied to at least one among the driving coils 410 to allow the first moving part 200 and the lens assembly 210 to move, thereby controlling and alleviating a mess of a photographing image, which is caused by vibration.

Accordingly, the cover part 400 may include driving coil seating parts 402 for mounting at least one driving coil 410 and may include the flexible printed circuit board 420 for applying an electronic signal to the driving coil 410.

The driving coil seating part 402 may be arranged around the central hole C on the lower surface of the cover part 400 and may be configured to cover an edge of the driving coil 410 to safely support and fix the driving coil when the driving coil 410 is safely disposed. In addition, when the driving coil 410 is stably placed on the driving coil seating part 402, the driving coil seating part 402 may have an open lower side to allow the driving coil to interact with the magnet 220 arranged under the driving coil.

For example, in an embodiment of the present disclosure, four driving coil seating parts 402 may be configured to receive four driving coils 410 and arranged at the same interval and at corresponding positions around the central hole C. A pair of driving coils 410, which are arranged to form a major axis in the first direction (X) among the driving coils 410, are arranged in parallel with one another. Therefore, the first moving part 200 and the lens assembly 210 may help the first moving part 200 move in the first direction X on the plane perpendicular to the optical axis O. In addition, the driving coils 410, which are arranged to form a major axis in the second direction Y among the driving coils 410, are arranged in parallel with one another. Therefore, the first moving part 200 and the lens assembly 210 may help the first moving part 200 move in a second direction Y on the plane perpendicular to the optical axis O. In this case, the centers of the driving coil 410 and the magnet 220 are arranged on the same line so that the driving coil 410 and the magnet 220 may interact with each other.

Meanwhile, the present disclosure is not limited to the number and arrangement of driving coils 410, which are presented herein according to an embodiment, and may include various numbers of driving coils 410 or have various positions for the driving coils 410, required in order to prevent a hand-trembling, as is to be achieved by the present disclosure.

The flexible printed circuit board 420 may be arranged in the upper side of the cover part 400 in order to apply electricity to the driving coil 410. The flexible printed circuit 420 may be formed in a ring shape, like shapes of components configuring a camera module, so as not to apply an effect on the central hole C including the optical axis O.

The camera lens module 10 may further include the driving part 500 for driving the second moving part 300, an elastic member 510 for compensating adsorption force in the optical axis O direction, and a rod 520.

The driving part 500 is arranged on one side of the second moving part 300 or the base 100 and provides a driving force for allowing the second moving part 300 to move forward and backward in the optical axis O direction. For example, the driving force of the driving part 500 may control a gap (g) between the first moving part 200 and the second moving part 300 to allow a resonant frequency (f) between the magnet 220 and the yoke 310 to be variable, thereby improving hand-trembling correction performance. The driving part 500 is installed to control the gap (g), for example, the driving part 500 may include a step motor assembly or a DC motor assembly to which a bracket, clip, and a shaft for driving the second moving part 300 are connected, or the like.

The driving part 500 may include a driving cover 530 in addition to the elements. The driving cover 530 may be configured to cover surroundings of the driving part 500 arranged on the base 100 or the second moving part 300 and thus the driving part 500 can be protected from damage caused by an external shock.

In an embodiment of the present disclosure, the driving part 500 is arranged over the base 100 and the second moving part 300 and is arranged in contact with each of the edges of the base 100 and the second moving part 300 at the same time. Accordingly, the driving cover 530 may be installed on the base 100 so as to protect the upper portion of the driving part 500 and may also be installed on the second moving part 300 so as to protect the lower portion of the driving part 500. Meanwhile, the present disclosure is not limited to the number and arrangement of driving parts 500, which are presented herein according to an embodiment, and may include various numbers of driving parts 500 or have various positions for the driving parts 500, required in order to prevent a hand-trembling, as is to be achieved by the present disclosure.

At least one elastic member 510 may be arranged inside the camera lens module 10. When the second moving part 300 moves up and down in the optical axis O by the driving part 500, the elastic member 510 may set a range between the maximum and the minimum of a gap (g) between the magnet 220 and the yoke 310.

For example, the elastic member 510 is arranged in the base 100 and is coupled to the second moving part 300 through the rod 520 so as to guide movement of the second moving part 300. When the gap (g) between the magnet 220 and the yoke 310 is minimized, the elastic member 510 may be maximally compressed to have an influence on the magnitude and direction of a restitution force (R) which will be mentioned. In addition, when the gap between the magnet 220 and the yoke 310 is maximized, the elastic member 510 may be maximally expanded to have an influence on the magnitude and direction of the restitution force (R) which will be mentioned. The elastic member 510 is made of various members which can be compressed or expanded to implement an elastic force, such as a flat spring and a coil spring, and the elastic member 510 may be arranged on the external surface of the rod 520 passing through the camera lens module 10.

When the elastic member 510 is expanded or contracted, the rod 520 may guide the expansion or contraction and may be arranged inside the elastic member 510. At least one rod 520 may be arranged around the central hole C.

In an embodiment of the present disclosure, four rods 520 may be configured and arranged at the same interval and at corresponding positions around the central hole C. In addition, the elastic member 510 may be arranged on the external surface of the rod 520 and also arranged to pass through the base 100 or the second moving part 300 to guide movement of the second moving part 300 in the optical axis O. Meanwhile, the present disclosure is not limited to the number and arrangement of rods 520, which are presented herein according to an embodiment, and may include various numbers of rods 520 or have various positions for the rods 520, required in order to prevent a hand-trembling, as is to be achieved by the present disclosure.

The camera lens module 10 mounted on an electronic device 1 according to an embodiment of the present disclosure may be configured to be able to vary a gap between the magnet 220 and the yoke 310, thereby reducing the number of components in comparison with the conventional structure in implementing hand-trembling locking. At the same time, component costs can be reduced and an electronic device can be slimmed by properly controlling hand-trembling driving according to a photographing situation.

In addition, the camera lens module 10 of the present disclosure can greatly improve the amount of hand-trembling correction through interaction generated between the first moving part 200 and the second moving part 300. Generally, the magnet 220 mounted on the first moving part 200 and the yoke 310 mounted on the second moving part 300 are assembled on the positions facing each other and thus magnetic pulling power is applied with respect to each other. Generally, the lens assembly 210 and the second moving part 300 are in close contact with each other by using pulling power between the magnet 220 and the yoke 310. When actuating power is cut off, the center of the magnet 220 is made to coincide with the center of the yoke 310 to return the lens assembly 210 to its regular position. However, according to the camera lens module 10 of the present disclosure, the amount of hand-trembling correction can be changed by expansion of a correction angle, through adjusting a gap (g) between the magnet 220 and the yoke 310 in the optical axis O direction, in addition to general interrelation between the magnet 220 and yoke 310. For example, a resonant frequency (f) generated through interaction between the magnet 220 and the yoke 310 may be varied and an adsorption force (A), a restitution force (R) and DC sensitivity (D) which are related thereto, may be controlled, by varying the gap (g) between the magnet 220 and the yoke 310. The terms mentioned above refers to a frequency and forces relating to expansion of a hand-trembling correction angle. Hereinafter, a description of the adsorption force (A) and restitution force (R) and resonant frequency (f) and DC sensitivity (D) and a process of adjusting a hand-trembling correction angle through controlling a generated frequency and forces will be described.

Figure 5:
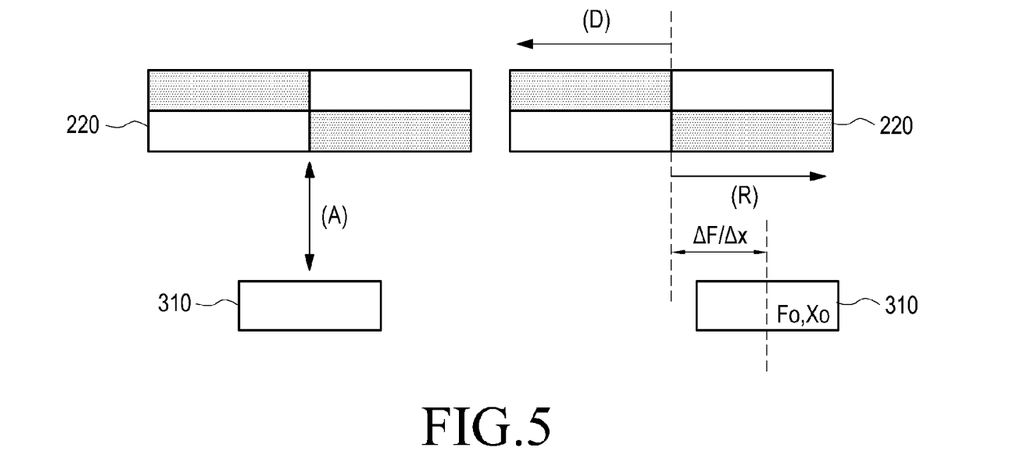
FIG. 5 is a simplified view that illustrates an interrelation between a magnet and a yoke in a camera lens module, according to an embodiment of the present disclosure.

FIG. 5 is a simplified view illustrating interrelation between a magnet and a yoke in a camera lens module according to an embodiment of the present disclosure.

FIG. 5(A) simply illustrates an adsorption force (A) which generates between the magnet 220 and the yoke 310 and FIG. 5(B) simply illustrates a restitution force (R) which generates between the magnet 220 and the yoke 310.

In the conventional technology designed to have a fixed gap (g) between the magnet 220 and the yoke 310, the above elements are used only for returning to a regular position between the magnet 220 and the yoke 310 through the cutting off of power supply. However, the present disclosure may be designed to adjust a gap (g) between the magnet 220 and the yoke 310 so that the present disclosure can adjust and utilize forces according to interaction generated between the magnet 220 and the yoke 310, for controlling a hand-trembling correction angle.

First, FIG. 5(A) illustrates an adsorption force (A) generated between the magnet 220 and the yoke 310, for example, the force in which the yoke 310 pulls the magnet 220 toward the yoke 310. Movement having a close relationship with each other between the first moving part 200 having the magnet 220 mounted thereon and the second moving part 300 having the yoke 310 mounted thereon may be generated since mutual attraction is applied to the magnet 220 and the yoke 310. In this case, the first moving part 200 may not be driven since the first moving part 200 can move on the plane (for example, an X and Y direction) perpendicular to the optical axis O. However, the second moving part 300 may be driven by the adsorption force (A) since the second moving part 300 can move in the optical axis O direction. Therefore, as in FIG. 5(A), which is designed to have a fixed size, when the yoke 310 moves toward the magnet 220, the adsorption force (A) may increase, and when the yoke 310 moves far from the magnet 220, the adsorption force (A) may decrease.

FIG. 5(B) illustrates a restitution force (R) generated between the magnet 220 and the yoke 310, for example, the force in which the magnet 220 returns to an initial position before moving. When the magnet 220 moves on the plane perpendicular to the optical axis O by a VCM driving force (D) generated by interaction between the magnet 220 and the driving coil 410, the magnet 220 moves to an initial position before the magnet 220 is moved and the center of the magnet 220 moves toward the center of the yoke 310. This is referred to as a restitution force (R).

The adsorption force (A) and the restitution force (R) are the forces which interact with a hand-trembling correction angle. As the adsorption force (A) and the restitution force (R) become smaller, the resonant frequency (f) decreases while the hand-trembling correction angle and the driving force increase.

The resonance frequency (f) refers to the frequency which occurs in an object when resonance occurs, and an equation of the resonant frequency (f) is shown as below.

$$\Delta f = \frac{1}{2\pi}\sqrt{\frac{k}{m}}, \quad k = \frac{\Delta F}{\Delta x} \quad \text{[Equation 1]}$$

wherein:
  f is a resonant frequency;
  k is a spring constant;
  m is the mass of a moving part;
  ΔF is a variance of a restitution force; and
  Δx is a displacement.

As noted from Equation 1 above, a resonant frequency (f) is determined by the relation between total mass of a moving part and a restitution force (R). When the moving part which moves by the VCM driving force has a fixed mass, a resonant frequency (f) is determined by a spring constant (k). The larger the spring constant (k) value, the higher the resonant frequency (f). In contrast, the smaller the spring constant (k) value, the lower the resonant frequency (f).

In addition, the spring constant (k) may control the resonant frequency (f) according to a variance of the restitution force (R) which correlates with a variance.

In the present disclosure, the second moving part 300 is set as a moving part and the second moving part 300 has a fixed mass. Therefore, the resonant frequency (f) is determined by a k value. Since the k value is proportional to the restitution force (R), the resonant frequency (f) may be varied according to a variance of the restitution force (R) between the magnet 220 and the yoke 310.

DC sensitivity (D) is inversely proportional to a spring constant (k) and a unit of the DC sensitivity is [mm/V]. When inputting a numerical value corresponding to unit V, the DC sensitivity indicates a distance in which a hand-trembling driving device can be driven. The higher the DC sensitivity, the larger the hand-trembling correction amount of a hand-trembling driving device that can be driven.

Figure 6:
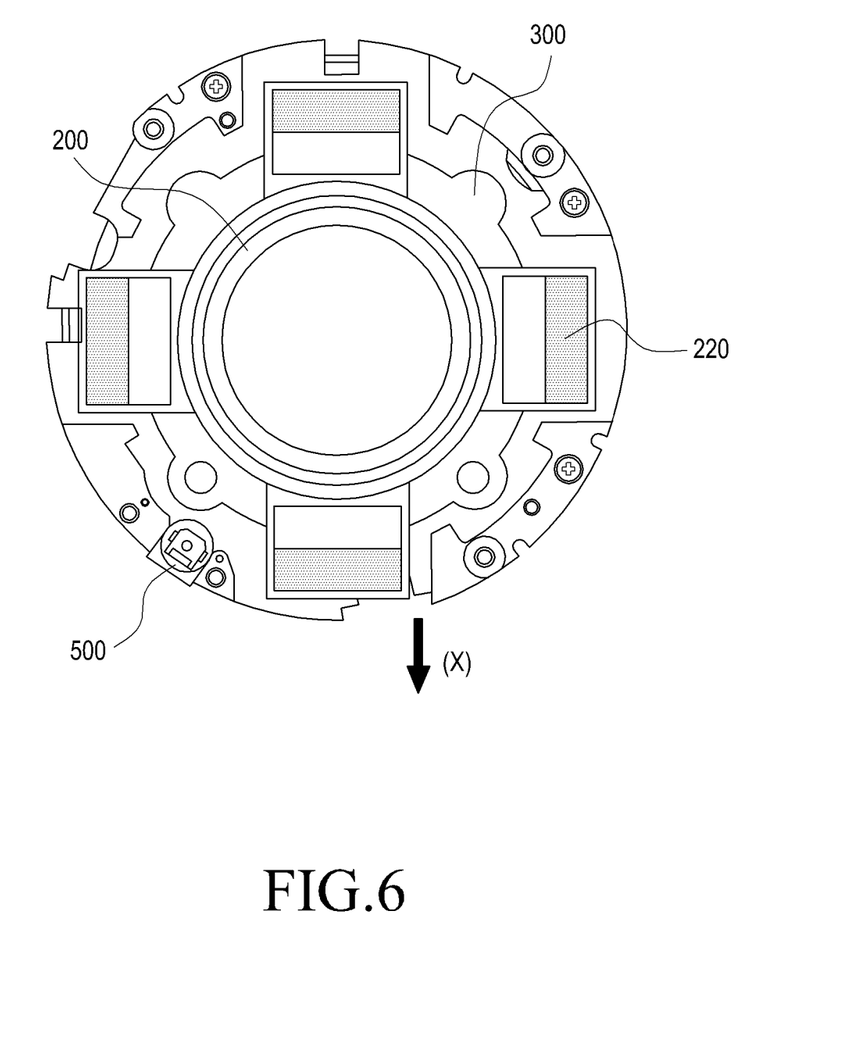
FIG. 6 is a top view of a camera lens module which illustrates an amount of deflection of a camera lens module, caused by gravity, according to an embodiment of the present disclosure.

FIG. 6 is a top view of a camera lens module which illustrates the amount of deflection of a camera lens module caused by gravity according to an embodiment of the present disclosure.

Referring to FIG. 6, when the camera lens module 10 stands in the direction of gravity, deflection may occur under the influence of gravity.

When correcting an amount of deflection (X) caused by gravity, generated in the camera lens module 10, it may have the same effect as using an extra hand-trembling locking structure. Thus, it is required to check forces correlated to the amount of deflection (X).

An equation of the amount of deflection (X) caused by gravity is as follows.

$$X = \frac{9.8^2}{(2\pi f)} \quad \text{[Equation 2]}$$

wherein:

x is an amount of deflection caused by gravity; and f is a resonant frequency.

Referring to equation 2, it is noted that the amount of deflection (X) is inversely related to the resonant frequency (f). For example, when the resonant frequency (f) increases, an amount of deflection (X) caused by gravity, which is generated in the camera lens module 10, may decrease. This implies the implementation of the same design without the hand-trembling locking structure separately provided in the conventional technology, and may further have an effect of consumption reduction, in which power for returning components of the camera lens module 10, which have moved by gravity, to regular positions, is not consumed. In addition, since an amount of vibration caused by an external shock decreases, noise generated in the camera lens module 10 can remarkably decrease and concern about damage can decrease.

Therefore, according to an embodiment of the present disclosure, in designing the camera lens module 10, the camera lens module is implemented to be able to minimize the amount of deflection (X) caused by gravity by adjusting the resonant frequency (f) and thus hand-trembling locking can be implemented without extra components.

Figure 7:
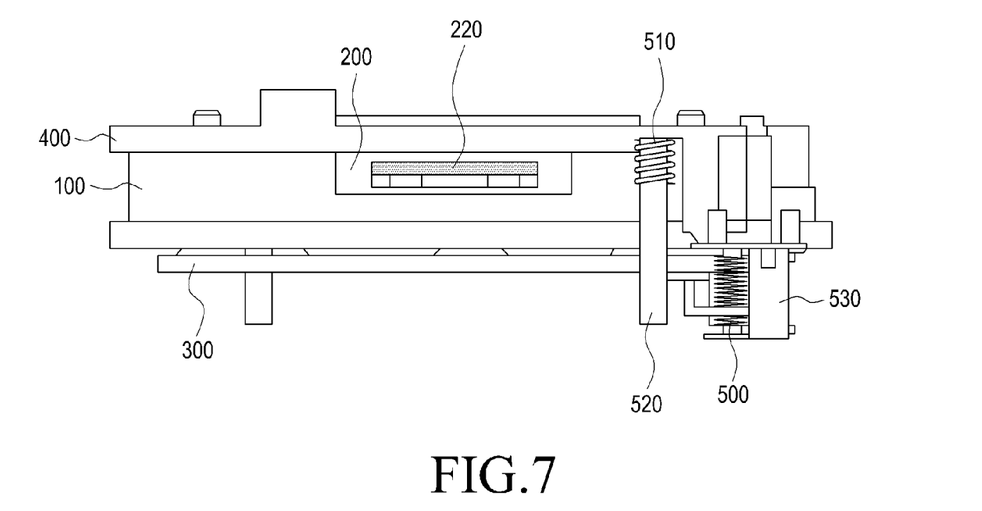
FIG. 7 is a cross-sectional view that illustrates a camera lens module in which a yoke has moved near to a magnet according to an embodiment of the present disclosure.
Figure 8:
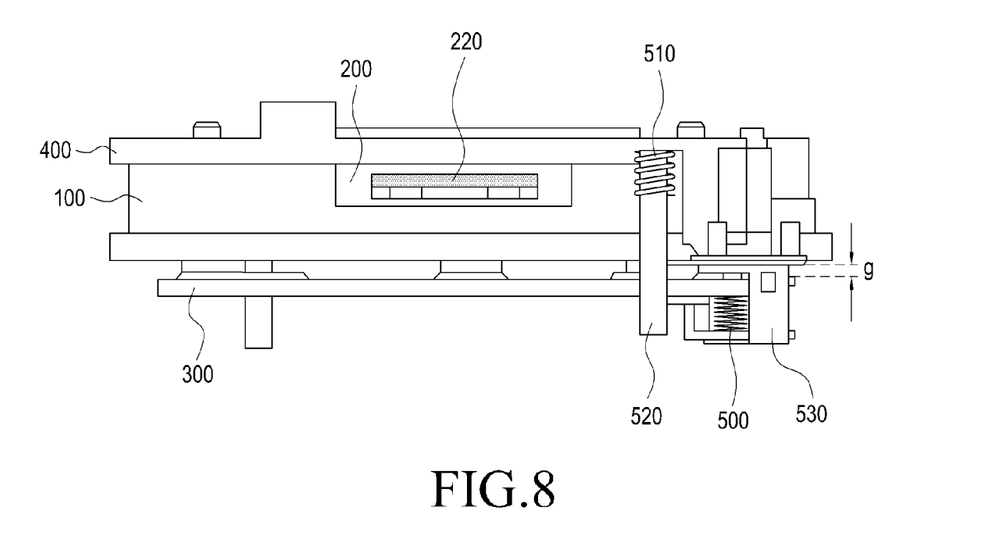
FIG. 8 is a cross-sectional view that illustrates a camera lens module in which a yoke has moved far from a magnet according to an embodiment of the present disclosure.

FIG. 7 is a cross-sectional view illustrating a camera lens module in which a yoke has moved near to a magnet according to an embodiment of the present disclosure. FIG. 8 is a cross-sectional view illustrating a camera lens module in which a yoke has moved far from a magnet according to an embodiment of the present disclosure.

As noted from FIGS. 7 and 8, as the second moving part 300 on which the yoke 310 is mounted moves in the optical axis O direction by driving of the driving part 500, a gap (g) between the yoke 310 and the magnet 220 may be controlled.

First, when the second moving part 300 having the yoke 310 mounted thereon moves in the upper side direction of the optical axis O, a gap (g) between the second moving part 300 having the yoke 310 mounted thereon and the first moving part 200 having the magnet 220 mounted thereon may be minimized. In this case, the elastic member 510 may be arranged so as to maintain the minimum gap (g) between the yoke 310 and the magnet 220.

When the yoke 310 has moved to be closest to the magnet 220, the gap (g) between the yoke 310 and the magnet 220 may be at minimum, and the mentioned adsorption force (A) and resonant frequency (f) may be at maximum. The DC sensitivity (D) may be at minimum. In addition, an amount of compression of the elastic member 510 may be at maximum and the restitution force (R) may be applied in the direction opposite to the adsorption force (A).

When the second moving part 300 having the yoke 310 mounted thereon moves in the lower side direction of the optical axis O, the gap (g) between the second moving part 300 having the yoke 310 mounted thereon and the first moving part 200 having the magnet 220 mounted thereon may be maximized. In this case, the elastic member 510 may be arranged so as to maintain a limit of the minimum gap (g) by the yoke 310 and the magnet 220.

When the yoke 310 has moved to be farthest from the magnet 220, the gap (g) between the yoke 310 and the magnet 220 may be at maximum, and the mentioned adsorption force (A) and resonant frequency (f) may be minimized. The DC sensitivity (D) may be maximized. In addition, an amount of compression of the elastic member 510 may be at minimum and the restitution force (R) may apply in the direction opposite to the adsorption force (A).

The adsorption force (A) of the magnet 220 and yoke 310 and the restitution force (R) of the elastic member 510 are similarly designed to achieve a balance between the forces, thereby accurately and smoothly moving the second moving part 300 having the yoke 310 mounted thereon.

As mentioned above, the camera lens module 10 according to the present disclosure may control a gap (g) between the magnet 220 and the yoke 310, through movement of the second moving part 300 in the optical axis O direction. The resonant frequency (f), the adsorption force (A), the restitution force (R), and the DC sensitivity (D) can be controlled according to a size of the gap (g), and an electronic device which can adjust a hand-trembling correction angle related thereto, as much as a user wants, according to a situation, can be implemented.

Figure 9A:
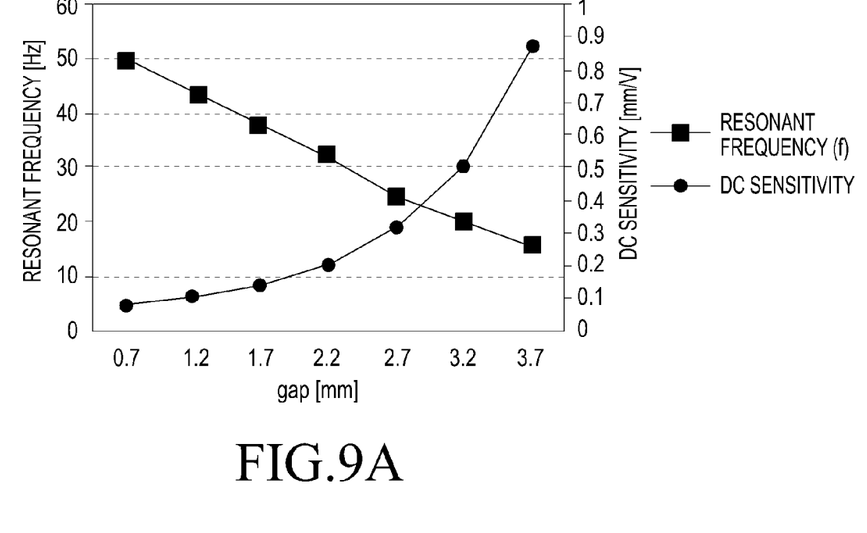
FIG. 9A is a graph which illustrates a characteristic of hand-trembling driving according to a variable gap between a magnet and a yoke according to an embodiment of the present disclosure.

FIG. 9A is a graph which illustrates a characteristic of hand-trembling driving according to a gap between a magnet and a yoke according to an embodiment of the present disclosure.

FIG. 9A is a graph which indicates variances of a resonant frequency (f) and DC sensitivity (D) according to a variable gap (g) between the magnet 220 and the yoke 310.

Referring to FIG. 9A, when the gap (g) between the magnet 220 and the yoke 310 becomes larger, a size of the resonant frequency (f) decreases and the DC sensitivity (D) increases. In addition, on the contrary, when the gap (g) between the magnet 220 and the yoke 310 becomes smaller, a size of the resonant frequency (f) increases and the DC sensitivity (D) decreases. This may be explained by the above equations. The resonant frequency (f) and the DC sensitivity (D) are controlled by using the camera lens module 10 which has a variable gap (g), so that an excellent hand-trembling prevention function can be implemented in photographing a subject.

Figure 9B:
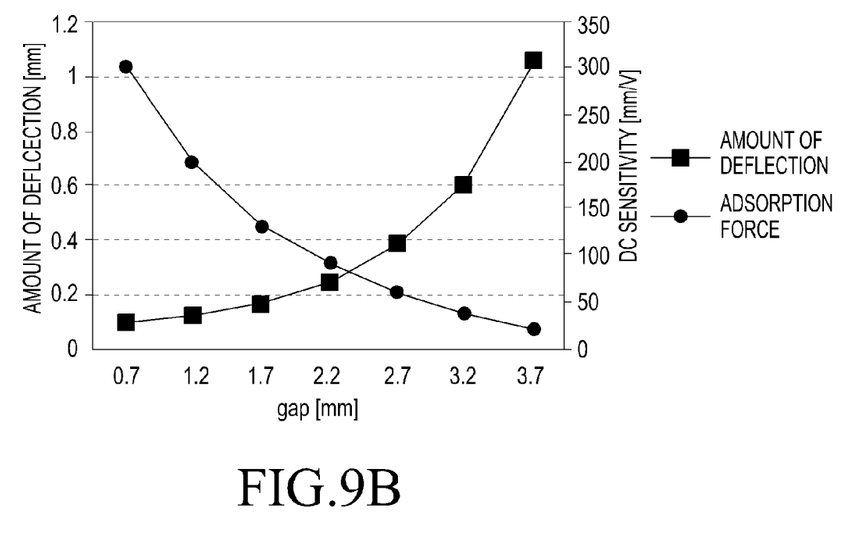
FIG. 9B is a graph which illustrates variances of an amount of deflection and adsorptive force according to a variable gap between a magnet and a yoke according to an embodiment of the present disclosure.

FIG. 9B is a graph that illustrates variances of the amount of deflection (X) and adsorption force (A) according to a variable gap (g) between the magnet 220 and the yoke 310.

Referring to FIG. 9B, when the gap (g) between the magnet 220 and the yoke 310 becomes larger, a size of the adsorption force (A) decreases and an amount of deflection (X) increases. In addition, on the contrary, when the gap (g) between the magnet 220 and the yoke 310 becomes smaller, a size of the adsorption force (A) increases and an amount of deflection (X) decreases. This may be explained by the above equations. An excellent hand-trembling prevention function can be implemented in photographing a subject, by using the camera lens module 10 which has a variable gap (g).

Hereinafter, according to varying the gap (g), an effect in which the camera lens module 10 can handle, in real time, with a hand-trembling which is changed according to a photographing situation, for example, according to situations by each photographing mode such as a static image/video, will be described.

Figure 10:
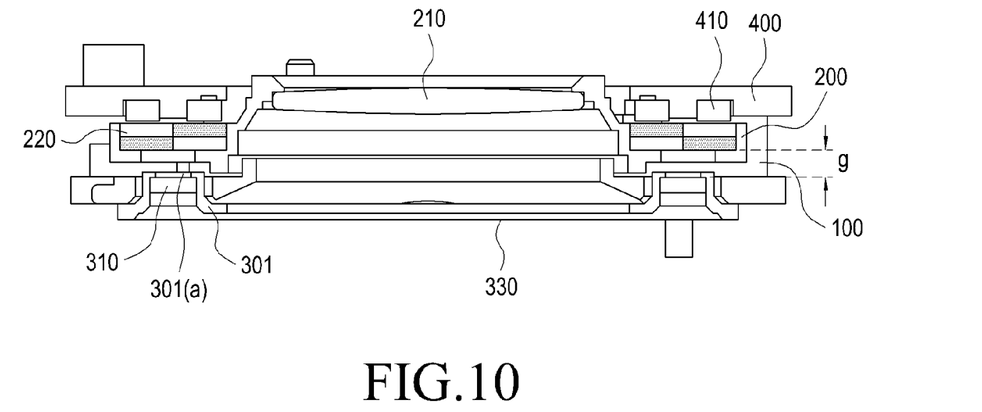
FIG. 10 is a cross-sectional view which illustrates a position of a yoke of a camera lens module, when the camera lens module is used for implementing a hand-trembling locking function, according to an embodiment of the present disclosure.
Figure 11:
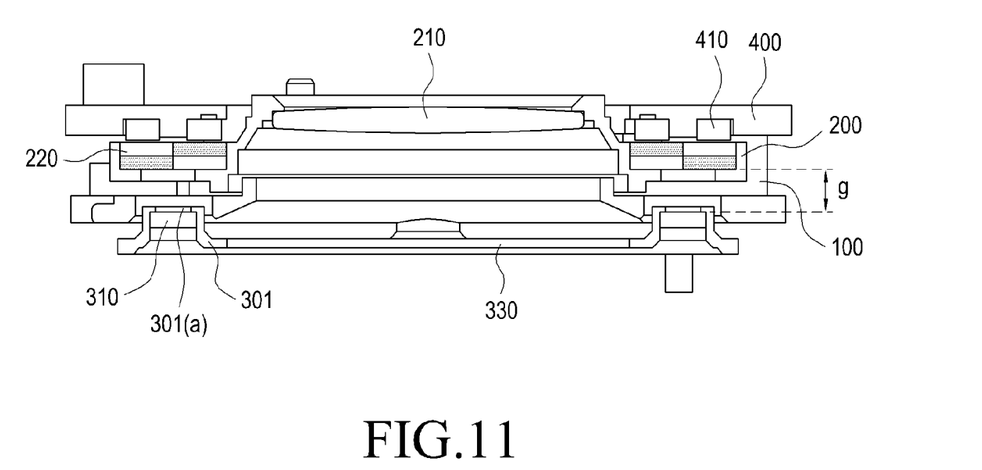
FIG. 11 is a cross-sectional view which illustrates a position of a yoke of a camera lens module, when the camera lens module is used for photographing a hand-trembling stop image, according to an embodiment of the present disclosure.
Figure 12:
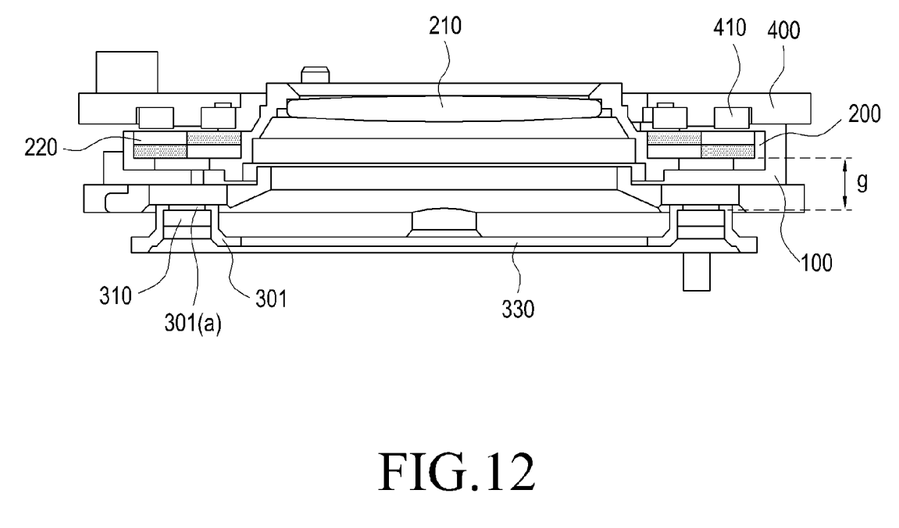
FIG. 12 is a cross-sectional view which illustrates a position of a yoke of a camera lens module, when the camera lens module is used for photographing a hand-trembling video, according to an embodiment of the present disclosure.

FIG. 10 is a cross-sectional view which illustrates a position of a yoke for implementing hand-trembling locking of a camera lens module according to an embodiment of the present disclosure. FIG. 11 is a cross-sectional view which illustrates a position of a yoke for photographing a hand-trembling static or still image of a camera lens module according to an embodiment of the present disclosure. FIG. 12 is a cross-sectional view which illustrates a position of a yoke for photographing a hand-trembling video using a camera lens module according to an embodiment of the present disclosure.

FIG. 10 illustrates the camera lens module 10 for implementing a hand-trembling drive locking (OIS Locking)

function without an additional electronic device. As mentioned above, equation 2 indicates that the amount of deflection (X) is inversely proportional to the resonant frequency (f). Therefore, it is necessary to increase the resonant frequency (f) in order to minimize the amount of deflection (X).

In order to form the minimum gap (g) between the magnet 220 and the yoke 310, it can be implemented by raising the second moving part 300 having the yoke 310 mounted thereon, which is movable in the optical axis O direction. Accordingly, the camera lens module 10 may operate the driving part 500 to raise the yoke 310 close to the magnet 220 in a range in which the elastic member 510 allows, so as to minimize a gap (g). As a result, the resonant frequency (f) is maximized so that the amount of deflection (X) may be lowered to the maximum value. In an embodiment of the present disclosure, when the resonant frequency (f) is over 50 Hz, the amount of deflection (X) is lowered to less than 0.1 mm.

As the amount of deflection (X) caused by gravity is lowered according to varying the gap (g) between the magnet 220 and the yoke 310 of the camera lens module 10, a device which can have a hand-trembling drive locking (OIS Locking) function can be manufactured. Furthermore, unlike the conventional camera lens module, because of the implementation of the function, when entering a locking mode, a hand-trembling driving device does not consume separate power for maintaining its balance and has a high restitution force (R), thereby reducing concern about damage and noise caused by bumping against other devices in spite of an external shock.

FIG. 11 illustrates the camera lens module 10 for implementing a function of a hand-trembling driving device when shooting a static image. Referring to the above-mentioned graph (see FIG. 9), when the resonant frequency (f) is too high, a movement amount for correcting a hand-trembling correction angle required in an optical device cannot be implemented since the DC sensitivity (D) extremely decreases. Accordingly, the present disclosure has solved the problem by adjusting the resonant frequency (f) and setting required DC sensitivity (D).

For example, the camera lens module 10 may adjust a gap (g) of the yoke 310 with respect to the magnet 220 to increase over a gap (g) implemented on the hand-trembling locking. Due to the increment of the gap (g), the resonant frequency (f) decreases while the DC sensitivity (D) increases, and thus photographing without wobble is possible through normal hand-trembling driving.

FIG. 12 illustrates a camera lens module 10 for implementing a function of the hand-trembling driving device when shooting video.

While photographing, the movement of a user's hand which holds a camera may frequently occur due to movement (for example, actions such as walking or climbing stairs). In this case, a bigger hand-trembling may occur, when compared with photographing a static image. A larger hand-trembling correction amount is required in order to correct a bigger hand-trembling.

As illustrated in the graphs of FIGS. 9A and 9B, and as described above, when the gap (g) between the magnet 220 and the yoke 310 becomes larger, the resonant frequency (f) decreases and the DC sensitivity (D) increases. Accordingly, when shooting a video, which requires larger DC sensitivity (D) than when photographing a static image, a scheme for photographing by maximizing the gap (g) to maximize the DC sensitivity (D) can be adopted. Therefore, even though a user takes a screen while moving, a shaking-free image can be obtained according to the present disclosure.

In addition, when it is necessary to change a hand-trembling correction amount in various situations, the camera lens module 10 can be usefully applied while varying the gap (g).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A camera lens module comprising:
   a base;
   a first moving part coupled to the base, wherein the first moving part is configured to contain a lens assembly and to move on a plane perpendicular to an optical axis of the lens assembly; and
   a second moving part disposed under the base, wherein the second moving part is configured to move in a direction along the optical axis of the lens assembly,
   wherein the second moving part forms a variable gap between the first moving part and the second moving part.

2. The camera lens module of claim 1, further comprising:
   at least one magnet mounted on one of the base and the first moving part; and
   at least one yoke configured to correspond to the at least one magnet and to be mounted on the second moving part,
   wherein the at least one magnet and the corresponding at least one yoke may generate a magnetic force in the optical axis direction, through a movement of the second moving part.

3. The camera lens module of claim 2, further comprising a driving part disposed on one of a side of the base or a side of the second moving part, wherein the driving part is configured to allow the second moving part to move forward and backward in the optical axis direction.

4. The camera lens module of claim 3, wherein the driving part is further configured to vary a distance of a gap formed between the first moving part and the second moving part when the second moving part moves forward and backward in the optical axis direction, wherein a change in the distance of the gap causes a corresponding change in resonant frequency.

5. The camera lens module of claim 4, further comprising:
   a cover part disposed above the first moving part and configured to cover an upper side of the first moving part, wherein the cover part includes at least one driving coil configured to correspond with and to face the at least one magnet.

6. The camera lens module of claim 5, wherein the at least one magnet comprises at least two pairs of magnets disposed symmetrically with respect to the optical axis.

7. The camera lens module of claim 6, wherein the at least one driving coil comprises at least two pairs of driving coils,
   wherein the at least two pairs of driving coils are configured to correspond with and to face the at least two pairs of magnets,
   wherein a driving force is generated by the first moving part as the second moving part moves forward and backward along the optical axis, and
   wherein an amount of the driving force depends on an interaction between the at least two pairs of driving coils and the at least two pairs of magnets.

8. The camera lens module of claim 5, wherein the second moving part includes at least one yoke groove for mounting at least one yoke, and wherein respective centers of the at least one magnet, the corresponding at least one yoke, and the at least one driving coil are disposed around the optical axis optical axis.

9. The camera lens module of claim 8, wherein, when the corresponding at least one yoke is mounted stably on the second moving part, the at least one yoke groove includes a yoke hole in the center of the yoke groove, and wherein an interaction between the at least one magnet and the corresponding at least one yoke is generated as the second moving part moves forward and backward in the optical axis direction.

10. The camera lens module of claim 8, wherein the base is configured to include a guide hole, and
when the corresponding at least one yoke is mounted stably on the second moving part, the guide hole is configured to guide the at least one yoke during movement forward and backward in the optical axis direction.

11. The camera lens module of claim 10, wherein the guide hole is formed larger than the yoke groove to reduce movement where the yoke groove can move from side to side.

12. The camera lens module of claim 5, further comprising
at least one rod configured to penetrate through the base, wherein the at least one rod is configured to guide the second moving part during movement forward and backward in the optical axis direction.

13. The camera lens module of claim 12, further comprising
an elastic member disposed to an external surface of the rod and configured to set a range of a variable gap measured between the at least one magnet and the corresponding at least one yoke, wherein the range of the variable gap depends on movement of the second moving part.

14. The camera lens module of claim 5, further comprising
a flexible printed circuit board disposed to the cover part and electrically connected to the driving part to supply power.

15. The camera lens module of claim 4, wherein the driving part is further configured to change an adsorption force of the at least one magnet and the at least one corresponding yoke based on a distance of a second gap between the magnet and the yoke.

16. The camera lens module of claim 4, wherein the driving part is further configured to change a DC sensitivity of the at least one magnet and the at least one corresponding yoke based on a distance of a second gap between the at least one magnet and the at least one corresponding yoke.

17. The camera lens module of claim 4, wherein the driving part is further configured to change an amount of deflection of the camera lens module based on a distance of a second gap between the at least one magnet and the at least one corresponding yoke, wherein the deflection is caused by gravity.

18. The camera lens module of claim 4, wherein the base, the first moving part, and the second moving part are disposed in a row along the side of the lens assembly.

19. A camera lens module comprising:
a base;
at least one magnet configured to move on a plane perpendicular to an optical axis of a lens assembly; and
at least one yoke disposed under and corresponding to the at least one magnet, wherein the at least one yoke is configured to move in the optical axis direction and to form a variable gap measured between the at least one magnet and the corresponding at least one yoke, wherein the variable gap changes a distance between the at least one magnet and the at least one corresponding yoke when the at least one corresponding yoke moves.

* * * * *